O. A. WIBERG.
LUBRICATING SYSTEM FOR BEARINGS.
APPLICATION FILED JULY 19, 1917.
1,257,773.
Patented Feb. 26, 1918.
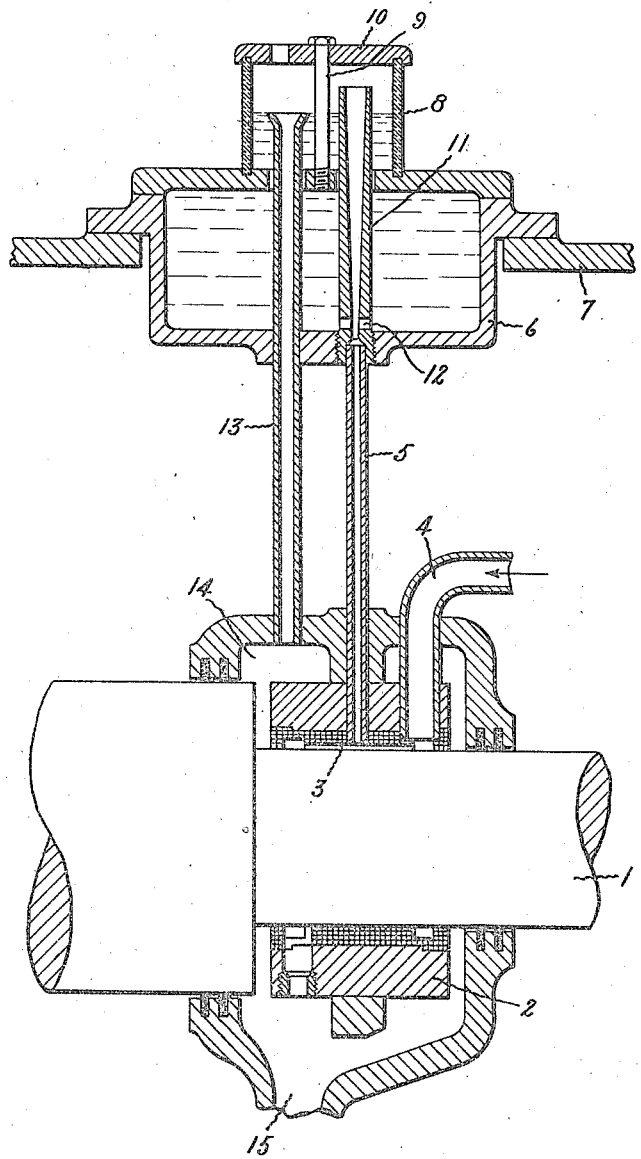
Inventor:
Oskar Anton Wiberg,
by Albert G. Davis
His Attorney.

UNITED STATES PATENT OFFICE.

OSKAR ANTON WIBERG, OF FINSPONG, SWEDEN, ASSIGNOR, BY MESNE ASSIGNMENTS, TO AKTIEBOLAGET LJUNGSTRÖMS ÅNGTURBIN, OF STOCKHOLM, SWEDEN, A CORPORATION.

LUBRICATING SYSTEM FOR BEARINGS.

1,257,773.

Specification of Letters Patent. Patented Feb. 26, 1918.

Application filed July 19, 1917. Serial No. 181,622.

*To all whom it may concern:*

Be it known that I, OSKAR ANTON WIBERG, a subject of the King of Sweden, residing at Finspong, Sweden, have invented certain new and useful Improvements in Lubricating Systems for Bearings, of which the following is a specification.

The present invention relates to lubricating systems for bearings and has for its object to provide an improved structure and arrangement in a system of this character.

For a consideration of what I believe to be novel and my invention, attention is directed to the accompanying specification and the claims appended thereto.

In the drawing, the figure is a vertical longitudinal section of a bearing and lubricating system embodying my invention.

Referring to the drawing, 1 indicates a shaft and 2 a bearing which is preferably provided with longitudinal oil-grooves or recesses 3. Connected with the bearing is a suitable oil pipe 4 through which lubricating oil is supplied to the bearing under pressure, as by means of a suitable oil pump (not shown).

Connected with the bearing and preferably communicating with an oil groove or recess 3 is a branch pipe 5 of comparatively small diameter, which serves to connect the bearing with an oil reservoir 6 located above the same. The oil reservoir 6 comprises a suitable casing carried by a support 7 and having on its upper side an oil cup 8, the side walls of which are formed of glazed material so that the oil therein is visible. The cup 8 may be held in position by a bolt 9 which passes down through the cup 10 and screws into the top wall of the reservoir 6. 11 indicates a nozzle having its lower end threaded into the bottom of oil reservoir 6, the upper end passing through an opening in the top wall thereof and terminating in the cup 8. The upper end of branch pipe 5 communicates with the lower end of nozzle 11. The throat or narrowest diameter of the nozzle 11 is at its lower end adjacent the bottom of the reservoir, and at this point it is provided with one or more openings 12 which serve to connect the throat with the reservoir 6. The pipe 5 and nozzle 11 constitute a stand-pipe for feeding oil to the reservoir. 13 indicates a drain pipe or overflow pipe, the upper end of which is located in the oil cup 10 at a level below that of the nozzle 11 and serves to convey the excess of oil back to the source, for example. In the present instance it is shown as leading to a chamber 14 in the bearing from which extends a drain opening 15.

In operation, when oil is supplied under pressure to the bearing through pipe 4, it will also be forced up through pipe 5 and nozzle 11, filling the casing 6 and oil cup 8 up to the upper end of the drain pipe 13. So long as the oil supply under pressure is maintained the casing 6 and cup 8 will be kept filled up to the level of the pipe 13, the surplus draining back through pipe 13 to the drain opening 15. During this time the oil cannot flow back to the bearing through openings 12 and pipe 5 owing to the kinetic energy of the jet of oil which streams from pipe 5 through the nozzle 11 and past the opening 12. As will be obvious, the oil in streaming through the nozzle 11 past openings 12 will have an ejector action tending to such oil through openings 12 up toward the top of the nozzle. Should the supply of oil through pipe 4 fail for any reason, as for example, due to the breaking of the oil pump or one of the pipes, or the breaking of a coupling of the pump, then the oil in the reservoir 6 will flow by gravity through openings 12 and down pipe 5 to the bearing, thus lubricating it, thereby preventing it from being immediately deprived of lubricant which might prove disastrous to the bearing, and in the case of a turbine bearing, disastrous to the turbine itself.

It will be seen that by my invention, I provide a supplementary supply of lubricant, which supply is always maintained from the main supply and which automatically feeds itself to the bearing by gravity in case the main supply fails.

The invention can be used to advantage in connection with an elastic fluid turbine provided with an emergency trip valve which is caused to automatically close in case the supply of lubricant to the bearing fails, as the supplementary supply will serve to lubricate the bearing during the time required for the turbine to come to rest.

In accordance with the provisions of the patent statutes, I have described the principle of operation of my invention, together with the apparatus which I now consider to represent the best embodiment thereof, but I desire to have it understood that the apparatus shown is only illustrative and that the invention can be carried out by other means.

What I claim as new and desire to secure by Letters Patent of the United States, is:—

1. The combination with a bearing and means for supplying lubricant thereto under pressure, of a reservoir, and conduit means connecting the reservoir to the lubricant supplying means and to the bearing, said reservoir being normally supplied with lubricant from the lubricant supplying means, but delivering its contents to the bearing in case the supply of lubricant from said lubricant supplying means fails.

2. The combination with a bearing and means for supplying lubricant thereto under pressure, of a reservoir located above the bearing, and a conduit connecting the reservoir to the bearing, said reservoir being normally maintained full of lubricant through the conduit as long as the lubricant supplying means supplies lubricant to the bearing but feeds its contents by gravity through the conduit to the bearing in case such lubricant supplying means fails.

3. The combination with a bearing and means for supplying lubricant thereto under pressure, of a reservoir located above the bearing and having an opening in its bottom, a nozzle in the reservoir having its lower end fastened in said opening, and a pipe connecting the nozzle to the bearing.

4. The combination with a bearing and means for supplying lubricant thereto under pressure, of a reservoir located above the bearing and having an opening in its bottom, a nozzle in the reservoir having its lower end fastened in said opening, said nozzle having an opening adjacent the bottom of the reservoir, a pipe connecting the nozzle to the bearing through which lubricant is supplied to the reservoir and through which it may flow back to the bearing, and an overflow pipe in the reservoir which determines the level of the lubricant therein.

5. The combination with a bearing, of a conduit supplying lubricant to the bearing under pressure, a stand pipe in open communication with the conduit and rising above the bearing, a reservoir which is supplied with lubricant from the stand pipe so long as the conduit delivers fluid under pressure to the bearing and which feeds lubricant to the bearing by gravity when the pressure supply fails, and a drain for carrying off the excess amount of lubricant supplied to the reservoir.

6. The combination with a shaft and bearing, there being a lubricant receiving recess between the shaft and bearing, a conduit supplying lubricant under pressure to the bearing and to said recess, a stand pipe in open communication with the recess, a reservoir which receives lubricant from the stand pipe during normal operation and returns it to the stand pipe and recess when the pressure of the supply falls below that due to the gravity head of the lubricant in the reservoir, a drain for carrying off excess lubricant from the reservoir, and an inclosure for the upper ends of the stand pipe and drain which has a transparent wall.

In witness whereof, I have hereunto set my hand this 29th day of May, 1917.

OSKAR ANTON WIBERG.